United States Patent
Key et al.

(10) Patent No.: US 12,277,575 B2
(45) Date of Patent: Apr. 15, 2025

(54) SYSTEM, METHOD AND COMPUTER-ACCESSIBLE MEDIUM FOR AUTHENTICATION OF REWARDS INFORMATION

(71) Applicant: Capital One Services, LLC, McLean, VA (US)

(72) Inventors: Kate Key, Effingham, IL (US);
Kenneth Taylor, Champaign, IL (US);
Mark Watson, Sedona, AZ (US);
Jeremy Goodsitt, Champaign, IL (US);
Vincent Pham, Champaign, IL (US);
Anh Truong, Champaign, IL (US);
Austin Walters, Champaign, IL (US);
Fardin Abdi Taghi Abad, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/074,199

(22) Filed: Dec. 2, 2022

(65) Prior Publication Data
US 2023/0169535 A1 Jun. 1, 2023

Related U.S. Application Data

(63) Continuation of application No. 16/811,111, filed on Mar. 6, 2020, now Pat. No. 11,562,390.

(51) Int. Cl.
*G06Q 30/02* (2023.01)
*G06Q 20/40* (2012.01)
(Continued)

(52) U.S. Cl.
CPC ..... *G06Q 30/0233* (2013.01); *G06Q 20/4018* (2013.01); *G06Q 30/0215* (2013.01); *G06Q 30/0234* (2013.01)

(58) Field of Classification Search
CPC .......... H01M 10/0569; G06Q 30/0215; G06Q 20/3226; H04L 9/0861
See application file for complete search history.

(56) References Cited

U.S. PATENT DOCUMENTS 6,223,215 B1 4/2001 Hunt et al.
8,224,697 B2 * 7/2012 Verma .................... G06Q 20/06
705/17

(Continued)

FOREIGN PATENT DOCUMENTS

WO 2005/086899 9/2005

OTHER PUBLICATIONS

Dr. Patangrao Kadam, A Secure Private Key Encryption Technique for Data Security in Modern Cryptosystem (Jul.-Dec. 2010), International Journal of Information Technology (BIJIT) vol. 2, pp. 207-270 (Year: 2010).*

(Continued)

*Primary Examiner* — Saba Dagnew
(74) *Attorney, Agent, or Firm* — HUNTON ANDREWS KURTH LLP (57) ABSTRACT

An exemplary system, method and computer-accessible medium can include receiving information regarding a purchase by a person, receiving financial account information regarding a financial account associated with the person that was used to fund the purchase, generating rewards information associated with the purchase, generating an authentication token(s) based on the financial account information, sending the rewards information and the authentication token(s) over a network, and receiving a confirmation, over the network, that a rewards account associated with the person has been updated.

20 Claims, 6 Drawing Sheets

(51) Int. Cl.
    *G06Q 30/0207*     (2023.01)
    *G06Q 30/0226*     (2023.01)
    *G06Q 30/0234*     (2023.01)

(56) References Cited

U.S. PATENT DOCUMENTS

| | | |
|---|---|---|
| 8,256,664 B1 | 9/2012 | Balfanz et al. |
| 8,371,502 B1 | 2/2013 | Galit et al. |
| 8,612,325 B2 | 12/2013 | Stacy et al. |
| 8,751,294 B2 | 6/2014 | Bhattacharya et al. |
| 9,224,141 B1 | 12/2015 | Lamba et al. |
| 9,619,792 B1 | 4/2017 | Aaron et al. |
| 2002/0046135 A1 | 4/2002 | Lage |
| 2004/0215573 A1 | 10/2004 | Teutenberg et al. |
| 2005/0075985 A1 | 4/2005 | Cartmell |
| 2007/0038515 A1 | 2/2007 | Postrel et al. |
| 2007/0118891 A1 | 5/2007 | Buer |
| 2007/0288372 A1 | 12/2007 | Behar et al. |
| 2009/0072026 A1 | 3/2009 | Lee et al. |
| 2010/0057580 A1 | 3/2010 | Raghunathan |
| 2010/0121692 A1 | 5/2010 | Top |
| 2010/0211500 A1 | 8/2010 | Armetta |
| 2010/0318415 A1 | 12/2010 | Gottlieb |
| 2011/0099384 A1 | 4/2011 | Grange et al. |
| 2011/0270665 A1 | 11/2011 | Kim et al. |
| 2011/0295744 A1 | 12/2011 | Wisniewski et al. |
| 2012/0072377 A1 | 3/2012 | Sherrod |
| 2012/0143705 A1 | 6/2012 | Bhattacharya et al. |
| 2012/0191513 A1 | 7/2012 | Ocher |
| 2012/0226545 A1 | 9/2012 | Gebb et al. |
| 2012/0323765 A1 | 12/2012 | Spaulding et al. |
| 2013/0073459 A1 | 3/2013 | Zacarias et al. |
| 2013/0144733 A1 | 6/2013 | Rothschild |
| 2013/0282468 A1* | 10/2013 | Michael ............ G06Q 30/0215 |
| | | 705/14.28 |
| 2013/0304620 A1 | 11/2013 | Bhattacharya et al. |
| 2014/0081839 A1 | 3/2014 | Blackhurst et al. |
| 2014/0081840 A1 | 3/2014 | Blackhurst et al. |
| 2014/0081847 A1 | 3/2014 | King et al. |
| 2015/0213439 A1 | 7/2015 | Kramer |
| 2015/0287030 A1 | 10/2015 | Sagady et al. |
| 2015/0288030 A1* | 10/2015 | Yoo .................. H01M 10/0569 |
| | | 429/188 |
| 2016/0092870 A1* | 3/2016 | Salama ............. G06Q 20/3226 |
| | | 705/44 |
| 2017/0132617 A1* | 5/2017 | D'Souza ............. H04L 9/0861 |
| 2018/0181958 A1 | 6/2018 | Locke et al. |
| 2018/0293573 A1* | 10/2018 | Ortiz ................... G06Q 20/102 |
| 2019/0385197 A1 | 12/2019 | Seneewongs et al. |
| 2021/0184843 A1* | 6/2021 | Shpurov ............. H04L 9/0861 |

OTHER PUBLICATIONS

Notification of Transmittal of the International Search Report and the Written Opinion of the International Searching Authority issued in related PCT Application No. PCT/US2021/020812, mailed May 26, 2021.

Notification Concerning Transmittal of International Preliminary Report on Patentability from related PCT Application No. PCT/US2021/020812, mailed Sep. 15, 2022.

* cited by examiner

| | |
|---|---|
| Merchant Name   210 | Merchant Name |
| Merchant 1 | Merchant 2 |
| Rewards Amount   215 | Rewards Amount |
| 400 | 1000 |
| Merchant Name | Merchant Name |
| Merchant 3 | Merchant 4 |
| Rewards Amount | Rewards Amount |
| 150 | 0 |

SYSTEM, METHOD AND COMPUTER-ACCESSIBLE MEDIUM FOR AUTHENTICATION OF REWARDS INFORMATION

CROSS-REFERENCE TO RELATED APPLICATION

The subject application is a continuation of U.S. patent application Ser. No. 16/811,111 filed Mar. 6, 2020, the contents of which is hereby incorporated by reference its entirety.

FIELD OF THE DISCLOSURE

The present disclosure relates generally to rewards accounts, and more specifically, to exemplary embodiments of an exemplary system, method, and computer-accessible medium for authentication of rewards information.

BACKGROUND INFORMATION

Rewards or loyalty programs are marketing strategies designed by merchants to encourage customers to continue to shop at or use the services of businesses associated with each program. These programs exist covering most types of commerce (e.g., technology, fashion, groceries, etc.), each one having varying features and rewards-schemes. Rewards programs typically involve generating a unique number associated with a specific rewards account. The number may be printed on a card and provided to the customer. When a consumer makes a purchase, the card is presented at such time, and the rewards account can be updated based on the purchase. For example, a fixed number of points can be assigned for each dollar spent. Rewards can then be spent or used at a later time for discounted or free merchandise or services.

In addition to increasing the number of rewards associated with a rewards account, tiers or levels within a rewards program can be defined, which can provide additional benefits to consumer. For example, once the purchaser earns a certain number of points, they can move from one level to another. Each level can provide better benefits to the purchaser, including, but not limited to, discounts on purchase, upgrades, etc. In many rewards programs, achieving a particular level or status can earn significantly better benefits. For example, in many hotel loyalty programs, achieving higher status levels can provide room upgrades, free food, and many other ancillary benefits.

In many instances, a single purchaser may not make enough purchases to earn a significant amount of rewards, or the purchaser may not make enough purchases to move from one tier to another. Thus, it is common practice for a purchaser to give their rewards number to another purchaser such that the other purchasers purchases get pooled into a single rewards account. If a single rewards number is shared with many purchasers, significant rewards can be earned, the cost of which (e.g., to the rewards issuer) can be significantly higher than if all of the purchasers had a separate rewards account.

While many people have only one rewards program, it is more common for a purchaser to have multiple rewards accounts at different merchants. While it can be possible to monitor one or two rewards accounts, it can be very difficult to keep track of every rewards account at every merchant. Certain apps exist which digitally store the rewards number associated with a merchant. However, the user still needs to separately access each rewards account to determine the number of rewards earned for each merchant.

Thus, it may be beneficial to provide an exemplary system, method, and computer-accessible medium for authentication of rewards information which can overcome at least some of the deficiencies described herein above.

SUMMARY OF EXEMPLARY EMBODIMENTS

An exemplary system, method and computer-accessible medium can include receiving information regarding a purchase by a person, receiving financial account information regarding a financial account associated with the person that was used to fund the purchase, generating rewards information associated with the purchase, generating an authentication token(s) based on the financial account information, sending the rewards information and the authentication token(s) over a network, and receiving a confirmation, over the network, that a rewards account associated with the person has been updated.

In some exemplary embodiments of the present disclosure, the financial account information can be a credit card number. The rewards information and the authentication token(s) can be received, an identity of the person can be verified based on the authentication token(s), the rewards account can be modified based on the verification. The rewards account can be opened and associated with the person based on the financial account information or further financial account information. A rewards inquiry can be received from the person, and A number of remaining points in the rewards account can be provided to the person or a rewards activity for the awards account can be provided to the person. The rewards account can be stored at a first financial institution and the financial account information can be for an account located at a second financial institution, and where the first financial institution can be different from the second financial institution. A display screen can be generated including further rewards information related to the rewards account and a further rewards account(s), where the further rewards information includes a number of reward points associated with the rewards account and the further rewards account(s).

Additionally, an exemplary system, method, and computer-accessible medium can include receiving financial account information, receiving rewards information regarding a number of the rewards to issue or deduct from a rewards account associated with a person, verifying an identity of the person based on the financial account information, and issuing or deducting the rewards based on the verification. The financial account information can be a credit card number. The rewards information can be based on a purchase by the person using the financial account information. The rewards information can be based on a redemption of the rewards.

Further, an exemplary system, method, and computer-accessible medium can include receiving financial account information, verifying that the financial account information is associated with a user(s), receiving a rewards account from the user(s), and linking the rewards account to the financial account information. The financial account information can be a credit card number. The financial account information can be verified by initiating a charge using the credit card number, and receiving an amount of the charge from the user(s). Further financial account information can be received from the user(s), the further financial account information can be verified as being associated with the user(s), and the further financial account information can be linked to the rewards account.

In some exemplary embodiments of the present disclosure, the financial account information can be a first financial account located at a first financial institution and the further financial account information can be a second financial account located at a second financial institution, and where the first financial institution can be different from the second financial institution. A further rewards account associated with the user(s) can be received, which can be linked to the financial information. Purchase information regarding a purchase at a store associated with the rewards account can be received, and a number of rewards in the rewards account can be modified based on the purchase. The financial account information can be associated with a financial institution and the rewards account can be associated with a store. Rewards redemption information associated with the rewards account can be received, and a number of rewards from the rewards account can be deducted based on the rewards redemption information.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

Figure 1:
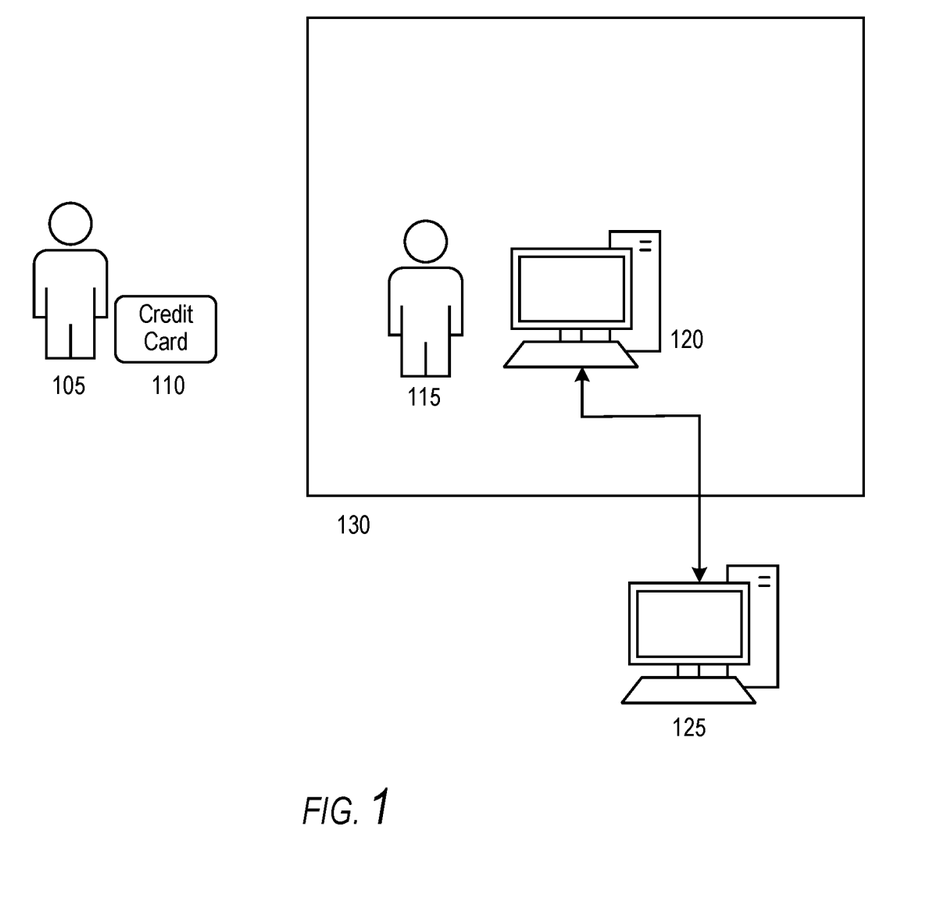
FIG. 1 is an exemplary diagram illustrating opening a rewards account and authenticating the identity of a customer according to an exemplary embodiment of the present disclosure.

FIG. 1 is an exemplary diagram illustrating opening a rewards account and authenticating the identity of a customer according to an exemplary embodiment of the present disclosure. The exemplary system, method and computer-accessible medium, according to an exemplary embodiment of the present disclosure, can include issuing and monitoring rewards for customers based on customer specific information. In particular, rewards accounts can be linked with one or more financial accounts that are associated with a particular purchaser. For example, when a person 105 opens up a rewards account at a merchant 130, the customer 105 can be required to provide the merchant 130 (e.g., a person 115 working at merchant 130) with certain financial account information (e.g., credit card 110). This can include payment mechanisms (e.g., credit card, debit card, electronic payments, such as Paypal, Apple Pay, Square pay etc.). The merchant 130 can perform a check on the customer using the financial account information 120 to verify the identity of the customer. For example, the financial account information 110 can ben input into a computing device 1120 located at merchant 130. Computing device 120 can communicate with an identify verification system 125, which can be located at merchant 130, or can be owned and operated by a third party (e.g., the banking institution that issued financial account 110 as discussed below). Once the customer's identity is verified, then the rewards account can be opened, and specifically linked to the financial account information 110 provided by the customer 105. For example, if a customer 105 only provides information for a single financial account, then only one financial account will be associated with the rewards account. If information for more than one financial account is provided, then all or a subset of the financial accounts can be linked to the rewards account.

After a rewards account has been opened by a customer, the customer can begin to earn rewards at the merchant. In contrast to prior systems where the customer was required to provide the rewards account number, the exemplary system, method and computer-accessible medium only needs the financial account information associated with the rewards account to earn rewards. For example, when the customer purchases the item from the merchant using one of the associated financial accounts, the exemplary system, method and computer-accessible medium can verify the purchase, and then determine the rewards account associated with the financial account. The rewards account can then be credited with the earned rewards. Because the rewards account is associated with the financial account, the customer does not need to keep track of the rewards account number in order to earn rewards. The process is seamless, and rewards are earned simply by using one of the financial accounts.

The customer can also use the financial account to verify the rewards account, but pay for the transaction using another form of payment (e.g., not the financial account used for verification). For example, during the transaction, either before or after payment, the financial account can be used to verify the rewards account. Thus, the consumer can pay with cash, a check, a store gift card, or a Visa/MasterCard/American Express gift card, and then present information associated with the financial account (e.g., a credit card) in order to verify and/or update the rewards information.

By requiring the use of a financial account associated with the rewards account, the exemplary system, method and computer-accessible medium can curb the significant problem of pooling rewards. For example, in current rewards systems, it is easy for one customer to share the rewards account number with other customers in order to pool the rewards. However, a customer is much less likely to share their financial account information for fear that the other customer will use the financial account in an unintended manner. Since rewards are only earned using an associated financial account, only purchases made by the actual customer will earn rewards. This can present a significant savings to the merchant as a particular number of rewards earned by a single customer can be much more expensive to the merchant than the same number of rewards earned by multiple customer.

After a particular number of rewards have been earned, a customer may wish to redeem the rewards for products, services, or benefits offered by a merchant. Currently, all that is required is the rewards account number in order to redeem the rewards. This non-protected method for redeeming rewards, however, is ripe with abuse. In particular, because it is so easy to redeem rewards using only the rewards account number, thieves only need to procure this number to redeem the rewards of another customer. This can present a significant problem for the customer, who can be unaware that their rewards were stolen, and for the merchant as they will be negatively viewed after a thief uses a customer's rewards. It can also be difficult for a merchant to determine that the customer redeeming the rewards is not the customer associated with the rewards account. The exemplary system, method and computer-accessible medium can solve this significant problem.

In particular, the exemplary system, method and computer-accessible medium, according to an exemplary embodiment of the present disclosure, can require the use of an associated financial account in order to earn rewards. Additionally, the exemplary system, method and computer-accessible medium can also require one of the associated financial accounts to be used when redeeming rewards. For example, when a customer wishes to redeem their rewards, they can choose the particular redemption and provide it to the merchant. The customer can be required to provide the financial account information to verify the identity of the customer. In particular, the exemplary system, method and computer-accessible medium can analyze the financial account information to determine if it matches one of the financial accounts provided when the rewards account was opened. If the account matches, then the rewards redemption can be approved. If the financial account does not match, then the redemption can be denied, and a notification can be provided to the merchant that an unauthorized financial account was used to attempt to redeem rewards. By requiring the financial account information associated with a particular customer for rewards redemptions, much of the abuse now present in rewards systems can be eliminated.

When a rewards account is opened up, and is tied to a specific financial account, a rewards account number can be automatically generated. However, this rewards account number can be kept secret from the customer. Thus, the customer cannot provide the rewards account number to multiple parties who can share the rewards account. When a customer makes a purchase using one of the associated financial accounts, the rewards account is automatically credited with the rewards. Since the customer does not need to keep track of the rewards number, rewards can be earned with every purchase. Additionally, the customer no longer needs to worry about forgetting to provide the rewards information when making a purchase. Thus, the customer will no longer miss reward's earning opportunities when they did not have the rewards account information.

While it can be beneficial to keep the rewards account information secret from the customer, it can be beneficial to use the rewards account as a form of two-factor authentication. Two-factor authentication is an authentication method in which a user or customer is granted access only after successfully presenting two or more pieces of evidence (or factors) to an authentication mechanism. This can be something the customer knows and the something the customer has. In particular, the first factor in the two-factor authentication can be the use of the financial account associated with the rewards account. When the financial account is presented by the customer, the exemplary system, method and computer-accessible medium can look up the rewards account associated with the financial account. The customer can then be prompted to provide the rewards account number (e.g., the second factor in the two-factor authentication). If the rewards number matches, then the rewards can be earned. If the rewards account information does not match, then the transaction can be approved, but no rewards will be earned.

Alternatively, before each purchase, the customer can be required to provide a rewards account number and financial account information. The exemplary system, method and computer-accessible medium can then look up the rewards account number to determine the financial accounts associated with the rewards account. A check can then be made to determine if the financial account provided by the customer matches one of the accounts associated with the rewards account. If the financial account matches, then the transaction can proceed and rewards can be earned. If the financial account does not match, then the transaction can proceed, but no rewards will be earned.

In addition to providing two-factor authentication for earning rewards, the rewards account and the financial account can provide two-factor authentication for the transaction itself. This can prevent a significant amount of fraudulent transactions that can occur by a thief who only has financial account information associated with a customer. For example, when a customer wishes to proceed with a transaction, the merchant can require the customer to provide a rewards account number, and a financial account associated with the rewards account number. The exemplary system, method and computer-accessible medium, according to an exemplary embodiment of the present disclosure, can look up the rewards account number, and then verify that the financial account provided matches one of the associated financial accounts. If it does not match, then the transaction can be denied, and the customer and/or the police can be notified of a fraudulent transaction. If the financial account does match, then the transaction can be approved.

Alternatively, when the financial account information for the transaction is provided, the exemplary system, method and computer-accessible medium can determine if any rewards account are associated with the financial account. If there is an associated rewards account, the customer can be prompted to enter the rewards account information. If rewards account information is provided, and is verified to be associated with the financial account, then the transaction can be approved. If no rewards account information is provided, or if incorrect rewards account information is provided, then the transaction can be denied. A notification can then be sent to the holder of the rewards account, and/or the police, that a fraudulent transaction was denied. By requiring two-factor authentication for the transactions, which can be based on the rewards account and an associated financial account, a significant amount of credit card fraud currently present in transactions can be curbed.

If a financial account is lost, stolen or changed, then a new financial account can be associated with the rewards account. For example, if the credit card of a customer is stolen, the customer is generally issued a new credit card with a new number. The customer can inform the merchant about the change in account information, and provide the new account information to the merchant. The merchant can again perform an identity check on the account, comparing the identity of the person associated with the new financial account to the identity of the person associated with the rewards account and the old financial account. If they match, then the new financial account can be linked the rewards account, and the lost or stolen financial account can be removed. If a customer wants to add an additional financial account to be associated with the rewards account, then the same check can be performed. If the identities matched, the new financial account is added, but the current financial accounts associated with the rewards account can remain.

In addition, or alternatively, to a rewards system managed by each merchant, a centralized rewards system can be setup. Each merchant can contract with, or cooperate with a centralized rewards system. When a customer opens an account with a merchant, the request can be sent to the centralized rewards system that can verify the identity of the customer, as described above, and associate one or more financial accounts with the rewards account, as also described above. When a customer makes a purchase at a merchant, the purchase information is provided to the centralized rewards system (which can include the financial account and the purchase(s) made), which stores and keeps track of the rewards. The centralized rewards system can have multiple rewards account (e.g., one for each merchant) stored and associated with each customer. Thus, when the customer opens up a rewards account at a second merchant, the centralized rewards system will open up the additional rewards account and associate it with the same customer.

Figure 2:
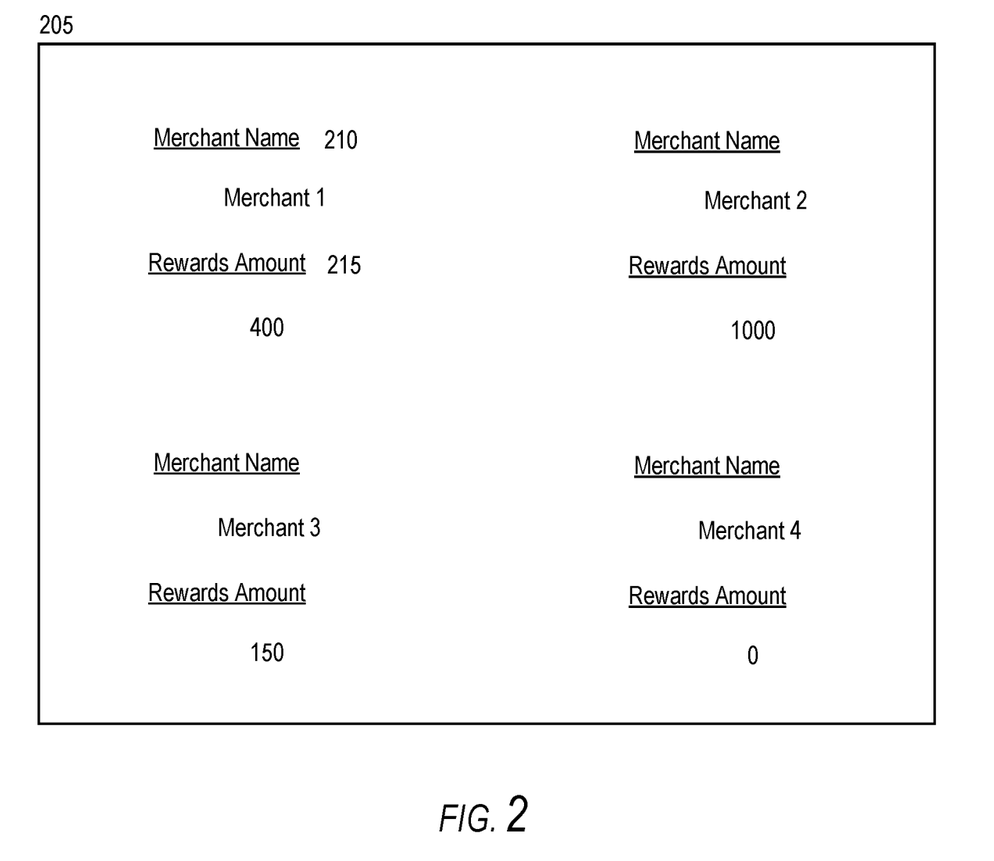
FIG. 2 is an exemplary diagram illustrating the display of information for multiple rewards accounts associated with a customer according to an exemplary embodiment of the present disclosure.

FIG. 2 is an exemplary diagram illustrating the display of information for multiple rewards accounts associated with a customer according to an exemplary embodiment of the present disclosure. Using a centralized rewards system can facilitate a user to more easily keep track of all of their rewards. Currently, since each rewards account is stored with each merchant, a user has to separately access the rewards account at each merchant to determine the number of rewards and associated benefits. Using a centralized rewards system, a user only needs to access the centralized rewards system to keep track of all of their rewards. When the user logs in to the centralized rewards system, the centralized rewards system can display a screen 205, which can include the rewards for one or more merchants. Display 205 can include the merchant name 210 and the rewards amount 215 for each merchant shown on display 205. The rewards can be displayed on a single page for ease of understanding by the user. When logged into the centralized rewards system, the user can select the rewards account (e.g., by selecting merchant 210 or rewards amount 215) for a particular merchant to receiving additional information about that account. For example, the centralized rewards system can include all of the rewards transactions associated with the rewards account including rewards redemptions.

Using a centralized rewards system facilitates a customer to more easily track their rewards, as all of their rewards information for each rewards account associated with a different merchant is accessed in a single place. In contrast to having multiple rewards account, the centralized rewards system can have only a single rewards account that is associated with the user/customer. Rewards from multiple merchants can be pooled into a single account, and the rewards from the single account can be redeemed at different merchants. For example, a user may make certain purchases at one merchant, which will credit the rewards account, and then make additional purchases at another merchant, which will credit the same rewards account. The user can then use the rewards at one of the two merchants, or even at a different merchant.

In some examples, rewards rate earnings and redemptions can be the same for each merchant. Thus, purchases made at one merchant will credit at the same rate as purchases made at another merchant. For example, if a customer makes a purchase at an electronics store, then the user can increase their rewards account at a rate of one point per dollar spent at the electronics store. If the customer makes a further purchase at a clothing store, then the rewards account can increase at a rate of one point per dollar spent at the clothing store. The customer can also redeem the rewards at an equal rate regardless of the merchant where the rewards are being redeemed. Alternatively, the rewards earning rate and redemption rate can be different for different merchants. For example, purchases made at an electronics store can earn more points that purchases made at a clothing store, and redemptions at an electronic store can cost more than redemptions at a clothing store. This can be based on the general profit structure associated with a merchant. For example, merchants having low costs and high profit margins can have different rewards earning rates and redemptions than merchants having high costs and low profit margins.

The exemplary system, method and computer-accessible medium can also be used only to keep track of rewards information. For example, rather than the centralized repository storing and facilitating the rewards program, the exemplary system, method and computer-accessible medium can interface with the rewards account located at each merchant. When the user logs into the centralized repository, the user can see all of their rewards accounts and the associated rewards. However, the centralized repository only obtains this information by querying the rewards account located at the merchant. For example, when the user logs into the centralized repository, the user can add rewards account information for each merchant, including the rewards number. The exemplary system, method and computer-accessible medium, according to an exemplary embodiment of the present disclosure, can then query the merchant for to obtain some or all of the information associated with the rewards account. This can include only the current number of rewards, or more detail include transaction history (e.g., rewards earning and rewards redemption history).

Exemplary Application Programming Interface

In order to open a rewards account and/or associate it with a particular financial account and exemplary application programming interface ("API") can be used. The API can facilitate the addition of rewards cards or accounts to a particular rewards account, and rewards account can have different credit cards that can be linked to one or more accounts at a bank (e.g., there can be different credit cards issued by different banking institutions). The exemplary API can facilitate the use of the credit cards as proof of identity of the customer. Thus, when a user opens a rewards account using a financial account, the exemplary API can contact the banking institution associated with the financial account to verify the customer identity. If the customer's identity is verified, then the rewards account can be opened. Additionally, when the financial account is used for a purchase, the API can be called to provide the financial account information and/or the rewards account information to the banking institution to verify the identity of the customer. Various suitable authentication methods can be used, which can include token-based authentication and/or credit card transaction verification based authentication, as discussed below.

Exemplary Authentication

The exemplary system, method, and computer-accessible medium can utilize various types of authentication. In one example, as described below, a token-based authentication system can be used. Alternatively, a session-based authentication system can be utilized. In a session-based authentication system, the server will create a session for the transaction once the transaction has completed and the rewards information has been entered. The session ID can then be stored on the merchant's server, and sent to the entity that stores the rewards information. The rewards' entity server can then receive the session ID, and compare it to the session information stored in the memory to authenticate the consumer. As a financial transaction can include a discrete set of events over a short period of time (e.g., the entire transaction and rewards activity can be sent to the rewards entity in one transmission), in certain circumstances session-based authentication can be beneficial.

Exemplary Transaction Verification Based Authentication

In to verify the identity of the customer when opening a rewards account, or when associating a rewards account with a centralized rewards system (as discussed above) a transaction verification based authentication system can be used. For example, the merchant or the centralized rewards system can initiate one or more small transactions on the financial account (e.g., one or more charges can be initiated on the credit card). The user/customer can then be asked to input the number of charges and the amount for each charge. As only this information should only be accessible by the customer/user, this information can be used to verify the identity of the customer/user. If the correct number of charges, and amount per charge, are entered, then the customer/user can be verified and the rewards account can be opened, or associated with the centralized rewards system. If the correct information is not provided, then the rewards account may not be opened, and a fraud alert can be placed on the financial account.

Exemplary Token-Based Authentication

In addition, or alternatively, to a session-based authentication system and a transaction verification based authentication system, a token-based authentication system can be used. Token based authentication functions by ensuring that each request to a server is accompanied by a signed token which the server (e.g., rewards monitor) verifies for authenticity and only then responds to the request (e.g., updating of a rewards account). For example, JSON Web Token ("JWT") is an open standard that defines a compact and self-contained method for securely transmitting information between parties encoded as a JSON object. JWT is compact in size which allows tokens to be easily transmitted via query strings, header attributes and within the body of a POST request. The access token can include the security credentials (e.g., the financial account information) for the consumer.

The exemplary Tokens can be stateless. The token can be self-contained and can include all the information needed for authentication. This can facilitate for scalability as it can free a server from having to store session state. The token can be generated from anywhere (e.g., from any merchant or any POS device that can be used to pay for merchandise as well as enter rewards information. Token generation is thus decoupled from token verification, facilitating the signing of tokens on one server (e.g., at the merchant) and the authentication at a different server (e.g., the entity that stores the rewards account to be updated).

The exemplary tokens are signed to protect against manipulation. However, the tokens may or may not be encrypted. If the tokens are encrypted, then either private key/private key encryption can be employed between the merchant and the entity that stores the rewards account to be updated, or public key/private key encryption can be employed. If the token is not encrypted, the token can be easily decoded and its contents revealed for verification of the rewards activity.

In order to generate a token, the exemplary system, method, and computer-accessible medium can be provided with financial account information associated with a purchaser (e.g., a credit card number associated with a consumer). Credentials can be validated (e.g., based on the financial account information) and a signed token can be generated (e.g., by the merchant). The signed token can be sent along with other information (e.g., rewards activity) as a validation of such information. After receiving the rewards activity and the token, the rewards activity can be verified based on the token, and the associated rewards account can be updated if the token is authentic. If the token is not authentic, then the rewards account will not be updated. In such an example, a denial can be sent back to the merchant that the authentication token and the rewards account do not match.

The exemplary Token-Based Authentication is stateless authentication procedure. It can expire after a set amount of time, which can be set by the merchant or the token verifier. If the token has expired, a new token can be generated (e.g., for each financial transaction and rewards activity).

The token for the exemplary Token-Based Authentication can be generated by the merchant, or it can be stored/maintained by the credit card company associated with the credit card used. For example, when the transaction is initiated, the credit card company can provide the merchant with a token associated with the credit card, which can then be used to validate the rewards information. Additionally, or alternatively, the token can be stored on the credit card itself, and can be updated by modifying the information contained on the credit card, for example, if the token expires.

Figure 3:
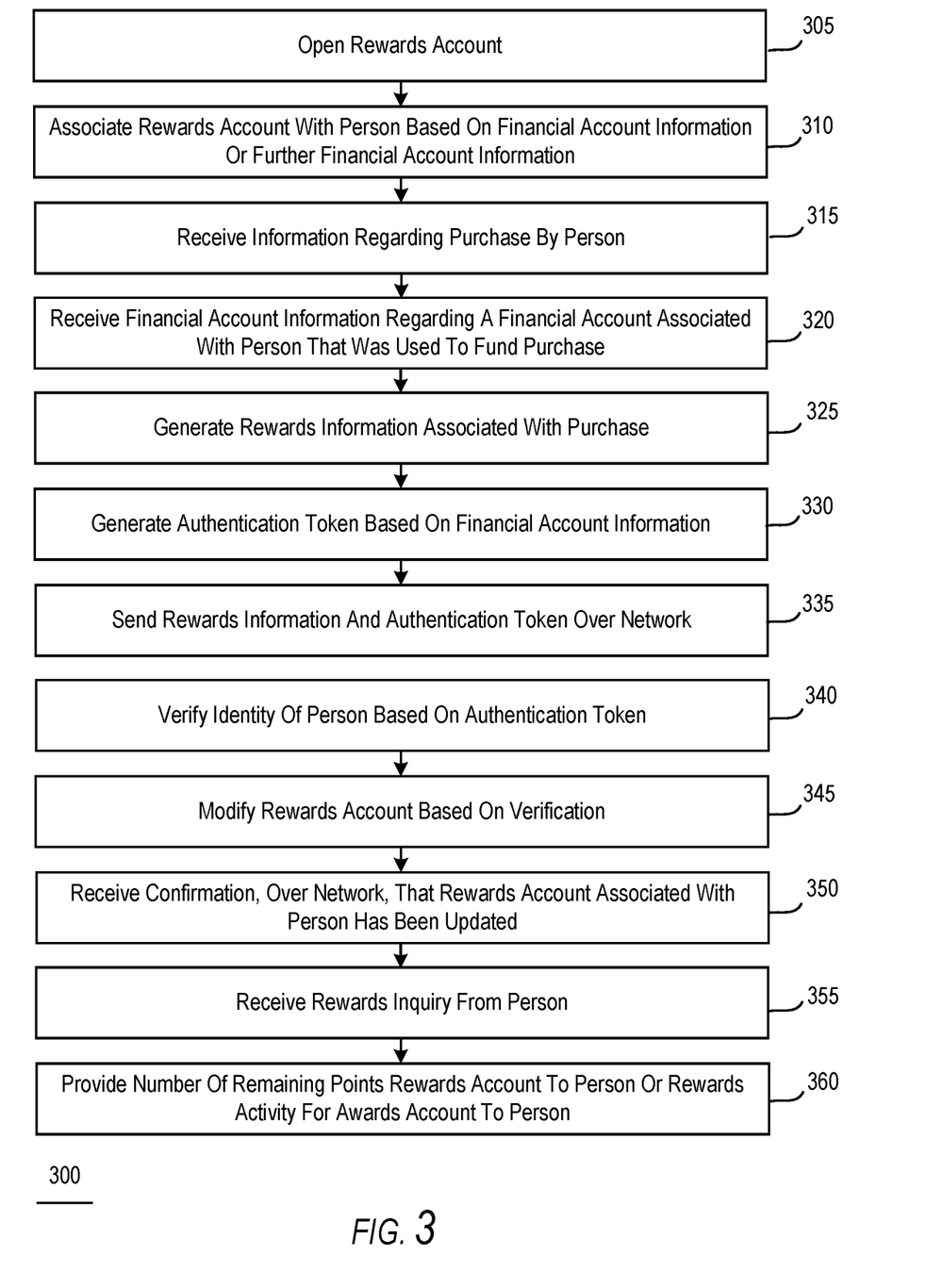
FIGS. 3-5 are flow diagrams of methods for receiving, verifying and/or updating rewards accounts according to an exemplary embodiment of the present disclosure.
Figure 4:
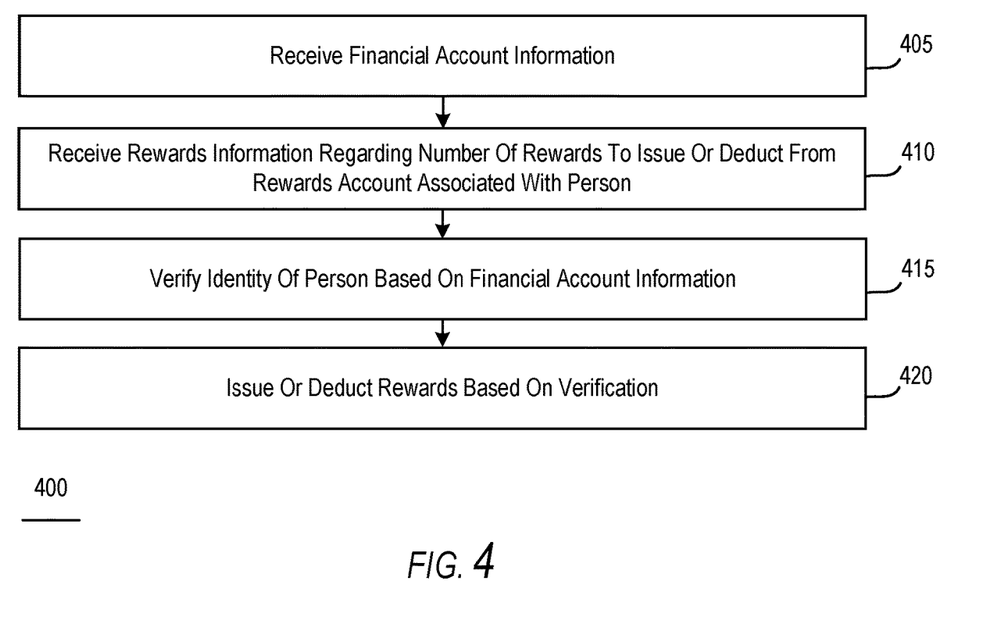
Figure 5:
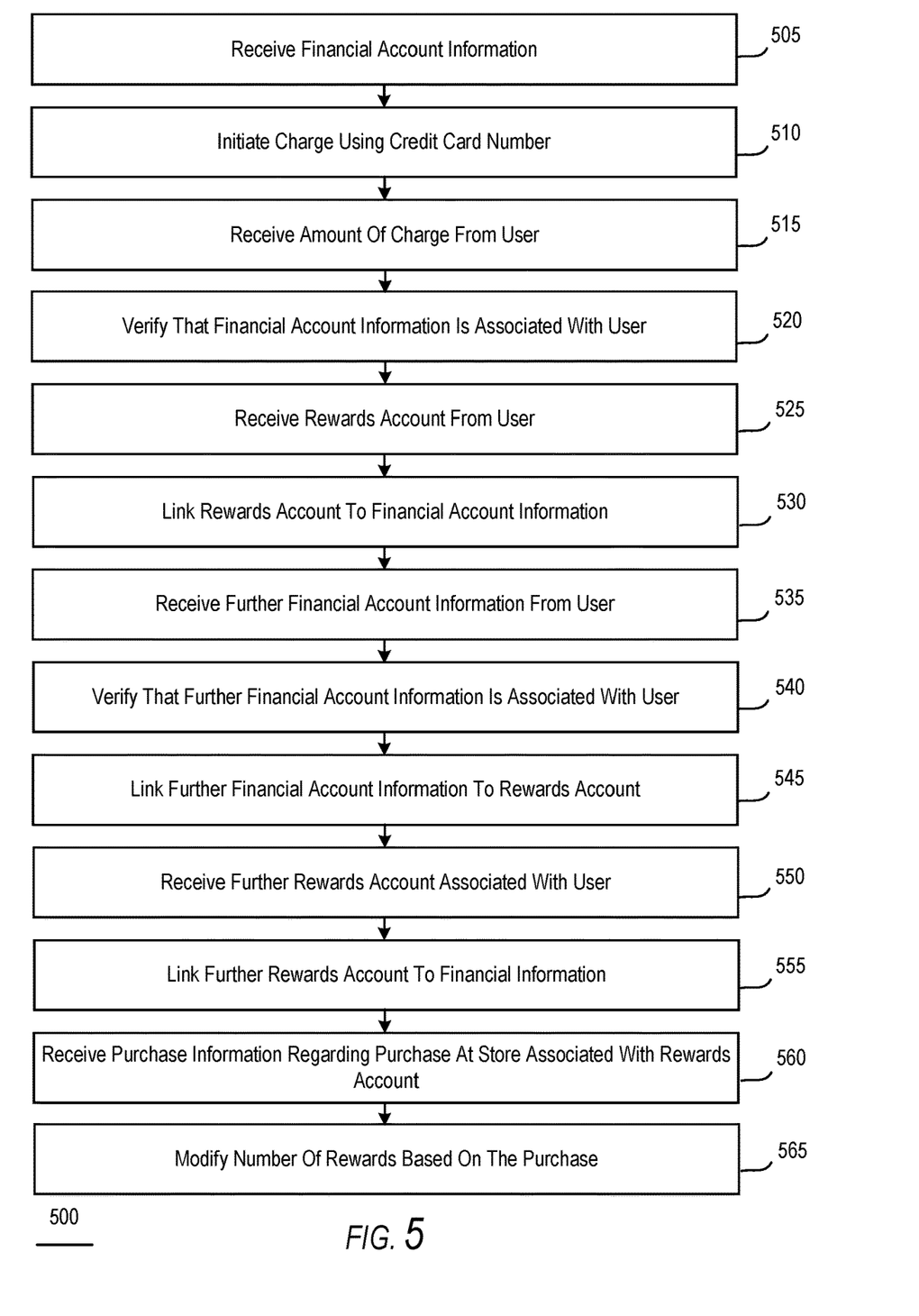

FIGS. 3-5 are flow diagrams of methods 300, 400, and 500 for receiving, verifying and/or updating rewards accounts according to an exemplary embodiment of the present disclosure.

For example, as shown in FIG. 3, at procedure 305, a rewards account can be opened. At procedure 310, the rewards account can be associated with a person based on financial account information. At procedure 315, information regarding a purchase by the person can be received. At procedure 320, financial account information regarding a financial account associated with the person that was used to fund the purchase can be received. At procedure 325, rewards information associated with the purchase can be generated. At procedure 330, an authentication token can be generated based on the financial account information. At procedure 335, the rewards information and the authentication token can be sent over a network. At procedure 340, an identity of the person can be verified based on the authentication token. At procedure 345, the rewards account can be modified based on the verification. At procedure 350, a confirmation can be received, over the network, that the rewards account associated with the person has been updated. At procedure 355, a rewards inquiry can be received from the person. At procedure 360, a number of remaining points in the rewards account or rewards activity can be provided to the person.

As shown in FIG. 4, at procedure 405, financial account information can be received. At procedure 410, rewards information regarding number of rewards to issue or deduct from rewards account associated with person can be received. At procedure 415, an identity of the person can be verified based on the financial account information. At procedure 420, rewards can be issued or deducted based on the verification.

As shown in FIG. 5, at procedure 505, financial account information can be received. At procedure 510, a charge using credit card number can be initiated. At procedure 515, an amount of the charge can be received from the user. At procedure 520, the account information can be verified as being associated with the user. At procedure 525, a rewards account can be received from the user. At procedure 530, the rewards account can be linked to financial account information. At procedure 535, further financial account information can be received from the user. At procedure 540, the further financial account information can be verified as being associated with the user. At procedure 545, the further financial account information can be linked to the rewards account. At procedure 550, further rewards account associated with user can be received. At procedure 555, the further rewards account can be linked to the financial information. At procedure 560, purchase information regarding a purchase at a store associated with the rewards account can be received. At procedure 565, a number of rewards in rewards account can be modified based on purchase.

Figure 6:
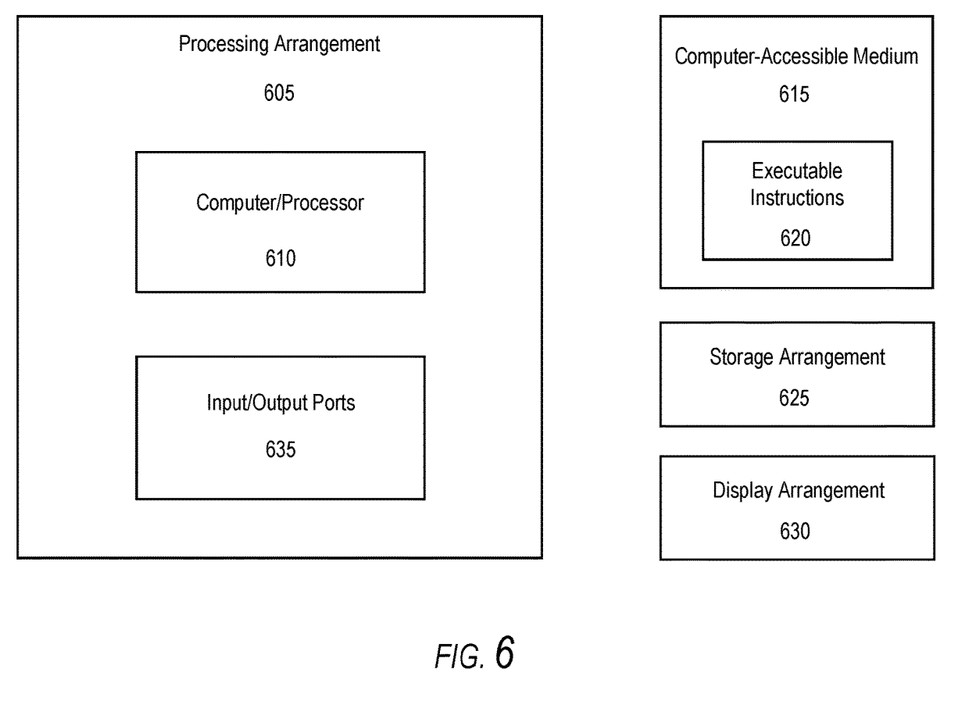
FIG. 6 is an illustration of an exemplary block diagram of an exemplary system in accordance with certain exemplary embodiments of the present disclosure.

FIG. 6 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 605. Such processing/computing arrangement 605 can be, for example entirely or a part of, or include, but not limited to, a computer/processor 610 that can include, for example one or more microprocessors, and use instructions stored on a computer-accessible medium (e.g., RAM, ROM, hard drive, or other storage device).

As shown in FIG. 6, for example a computer-accessible medium 615 (e.g., as described herein above, a storage device such as a hard disk, floppy disk, memory stick, CD-ROM, RAM, ROM, etc., or a collection thereof) can be provided (e.g., in communication with the processing arrangement 605). The computer-accessible medium 615 can contain executable instructions 620 thereon. In addition or alternatively, a storage arrangement 625 can be provided separately from the computer-accessible medium 615, which can provide the instructions to the processing arrangement 605 so as to configure the processing arrangement to execute certain exemplary procedures, processes, and methods, as described herein above, for example.

Further, the exemplary processing arrangement 605 can be provided with or include an input/output ports 635, which can include, for example a wired network, a wireless network, the internet, an intranet, a data collection probe, a sensor, etc. As shown in FIG. 6, the exemplary processing arrangement 605 can be in communication with an exemplary display arrangement 630, which, according to certain exemplary embodiments of the present disclosure, can be a touch-screen configured for inputting information to the processing arrangement in addition to outputting information from the processing arrangement, for example. Further, the exemplary display arrangement 630 and/or a storage arrangement 625 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions, wherein, when a computer arrangement executes the instructions, the computer arrangement is configured to perform procedures comprising:
   associating a rewards account at a second entity with a financial account of a user at a first entity;
   receiving, based on an attempted transaction with the user's financial account, a signed authentication token packaged with rewards information for the rewards account based on the attempted transaction, wherein the authentication token includes financial account information associated with the user's financial account located at the first entity and security credentials, the signed authentication token being encrypted using a private key;
   decrypting the signed authentication token using the private key;
   authenticating the attempted transaction based on the signed authentication token;
   verifying that the financial account information is associated with the user based on the signed authentication token;
   verifying the rewards information based on the signed authentication token;
   removing a link between the financial account information and a prior rewards account;
   updating the rewards account at the second entity with the rewards information upon verification of the rewards information;
   generating a display screen configured to include rewards information related to the updated rewards account and at least one further rewards account, wherein the rewards information includes a number of reward points associated with the rewards account updated based on the attempted transaction; and
   displaying, on the display screen, the rewards information related to the rewards account.

2. The non-transitory computer-accessible medium of claim 1, the procedures further comprising:
   receiving further financial account information from the user, wherein the further financial account information is associated with a financial account located at a third entity;
   verifying that the further financial account information is associated with the user; and
   linking the further financial account information to the rewards account.

3. The non-transitory computer-accessible medium of claim 1, wherein:
   the financial account information comprises a credit card number, and
   the computer arrangement verifies the financial account information by:
      initiating a charge using the credit card number, and
      receiving an amount of the charge from the user.

4. The non-transitory computer-accessible medium of claim 1, the procedures further comprising:
   receiving a session identifier, wherein:
      the session identifier is generated after a transaction associated with the purchase was performed, and
      the session identifier is associated with the financial information; and further verifying that the financial account information is associated with the user based on a comparison of the session identifier to session information for the transaction associated with the purchase.

5. The non-transitory computer-accessible medium of claim 4, the procedures further comprising issuing or deducting rewards from the rewards account based on the verification.

6. The non-transitory computer-accessible medium of claim 4, the procedures further comprising:
receiving a rewards inquiry from the user, and
providing at least one of selected from the group of a number of remaining points in the rewards account to the user and a rewards activity for the awards account to the user.

7. The non-transitory computer-accessible medium of claim 1, the procedures further comprising:
opening the rewards account; and
associating the rewards account with the person based on the financial account or a further financial account.

8. The non-transitory computer-accessible medium of claim 1, the procedures further comprising:
receiving rewards redemption information associated with the rewards account; and
deducting a number of rewards from the rewards account based on the rewards redemption information.

9. The non-transitory computer-accessible medium of claim 1, wherein the rewards information includes a number of reward points associated with the rewards account.

10. The non-transitory computer-accessible medium of claim 1, wherein the rewards information is based on a purchase by the person using the financial account information.

11. A method performed by a computer arrangement, the method comprising:
associating a rewards account at a second entity with a financial account of a user at a first entity;
receiving, based on an attempted transaction with the user's financial account, a signed authentication token packaged with rewards information for the rewards account based on the attempted transaction, wherein the authentication token includes financial account information associated with the user's financial account located at the first entity and security credentials, the signed authentication token being encrypted using a private key;
decrypting the signed authentication token using the private key;
authenticating the attempted transaction based on the signed authentication token;
verifying that the financial account information is associated with the user based on the signed authentication token;
removing a link between the financial account information and a prior rewards account;
updating the rewards account at the second entity with the rewards information upon verification of the rewards information;
generating a display screen configured to include rewards information related to the updated rewards account and at least one further rewards account, wherein the rewards information includes a number of reward points associated with the rewards account updated based on the attempted transaction; and
displaying, on the display screen, the rewards information related to the rewards account.

12. The method of claim 11, wherein:
the financial account information comprises a credit card number, and
upon an unsuccessful verification, the method further comprises:
denying an issuance or deduction of the rewards,
denying linking the rewards account to the credit card, and
transmitting a notification identifying the credit card as unauthorized for rewards.

13. The method of claim 11, wherein:
the financial account information comprises a credit card number, and
the computer arrangement further verifies the financial account information by:
initiating a charge using the credit card number, and
receiving an amount of the charge from the user.

14. The method of claim 13, wherein, upon receipt of an incorrect amount of the charge, the method further comprises placing a fraud alert on the financial account information.

15. The method of claim 11, wherein the authentication token is a stateless token.

16. The method of claim 11, further comprising transmitting the signed authentication to the second entity.

17. The method of claim 11, further comprising:
receiving rewards redemption information associated with the rewards account; and
deducting a number of rewards from the rewards account based on the rewards redemption information.

18. A computer arrangement, comprising:
a microprocessor;
a memory; and
a display arrangement,
wherein the computer arrangement:
associates a rewards account at a second entity with a financial account of a user at a first entity;
receives, based on an attempted transaction with the user's financial account, a signed authentication token packaged with rewards information for the rewards account based on the attempted transaction, wherein the authentication token includes financial account information associated with the user's financial account located at the first entity and security credentials, the signed authentication token being encrypted using a private key;
decrypts the signed authentication token using the private key;
authenticates the attempted transaction based on the signed authentication token;
verifies that the financial account information is associated with the user based on the signed authentication token;
removes a link between the financial account information and a prior rewards account;
updates the rewards account at the second entity with the rewards information upon verification of the rewards information;
generates a display screen configured to include rewards information related to the updated rewards account and at least one further rewards account, wherein the rewards information includes a number of reward points associated with the rewards account updated based on the attempted transaction; and
displays, on the display screen, the rewards information related to the rewards account.

19. The computer arrangement of claim 18, wherein the computer arrangement:
  receives a session identifier, wherein:
    the session identifier is generated after a transaction associated with the purchase was performed, and
    the session identifier is associated with the financial information; and
  further verifies that the financial account information is associated with the user based on a comparison of the session identifier to session information for the transaction associated with the purchase.

20. The computer arrangement of claim 19, wherein the computer arrangement issues or deducts rewards from the rewards account based on the verification.

\* \* \* \* \*